United States Patent [19]

Beaupre

[11] Patent Number: 4,552,444

[45] Date of Patent: Nov. 12, 1985

[54] SYNTHESIS COLOR PHOTOGRAPHIC MAP AND METHOD OF MAKING SAME

[76] Inventor: Jean Beaupre, 3083 chemin des Quater Bourgeois, Ste-Foy, Canada, G1W 2K6

[21] Appl. No.: 677,062

[22] Filed: Nov. 30, 1984

[51] Int. Cl.⁴ .................................... G03B 19/00
[52] U.S. Cl. .................................... 354/354
[58] Field of Search .............................. 354/354

[56] References Cited

U.S. PATENT DOCUMENTS 3,238,857  3/1966  Henderson ................ 354/354

Primary Examiner—John Gonzales
Attorney, Agent, or Firm—Robic, Robic & Associates

[57] ABSTRACT

A synthesis color photographic map, on a predetermined scale, covering a wide geographic area. It is formed of a number of color photographic base maps each covering a selective portion of the wide geographic area and on the predetermined scale. These photographic base maps are assembled together to form the synthesis map. Each of the photographic base maps is a photography of a forestry base map which covers one of the selective portions of the above-mentioned area on a scale which is larger than the said predetermined scale. These forestry base maps are colored according to a given identification color code and then color photographed and scale reduced to the aforesaid predetermined scale.

6 Claims, 3 Drawing Figures

SYNTHESIS COLOR PHOTOGRAPHIC MAP

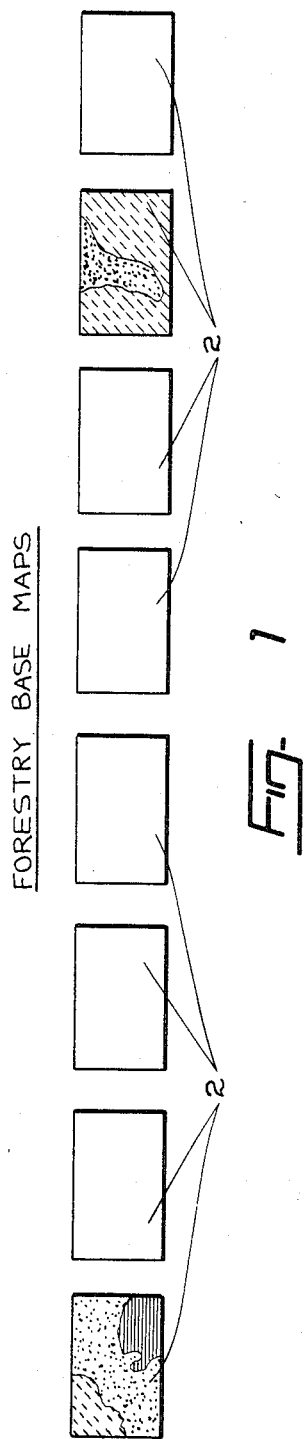
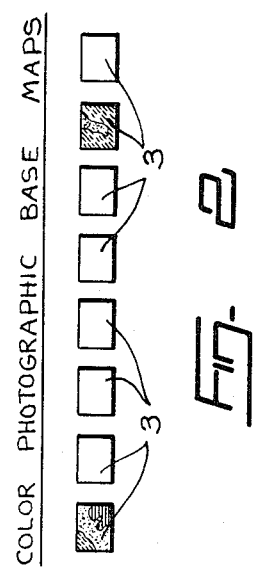
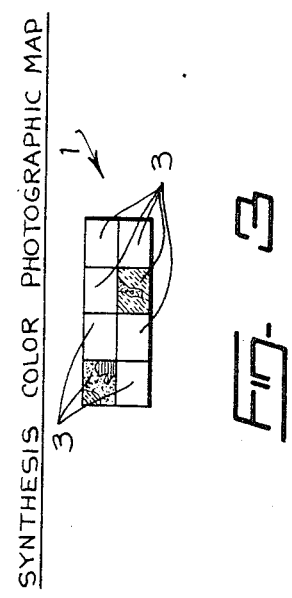

SYNTHESIS COLOR PHOTOGRAPHIC MAP AND METHOD OF MAKING SAME

The present invention relates to a synthesis color photographic map and to a method of making such a map, particularly useful in forestry.

Photographies by satellites of vast areas of the earth surface are now available and are of course found quite useful in an increasing number of fields. However, when it comes to forestry, their correct interpretation is difficult. This is not only because of the small scale of the satellite photography but, more so, because of the lack of clear contrast between areas having the similar types of vegetation growths, such as trees of different varieties or species, other types of vegetation or yet an absence of vegetation. It is also found that such varied areas are not always clearly or appropriately delimited.

A main object of the present invention is to overcome this difficulty of interpretation by providing a photographic map of the earth surface which will be the equivalent, as to the area of the earth covered and as to scale, to a satellite photography but which, in addition, will be colored according to a predetermined color code suitable, among other features, for the identification of the various types of growths appearing on the surface area covered. More generally, the identification color code is adapted to the needs of forest management, forest fire protection, forest exploitation, forest inventory as well as other services related to forestry and to the utilization of the territory.

Accordingly, the invention is herein broadly claimed as a method of making a synthesis color photographic map, on a first predetermined scale and covering a wide geographic area, from a number of forestry base maps, each forestry base map covering a selective portion of said wide geographic area on a second predetermined scale larger than said first predetermined scale, said method comprising the steps of:

coloring each of said forestry base maps according to a given identification color code;

color photographying said forestry unit maps thus colored while reducing the scale thereof to said first predetermined scale to thereby obtain color photographic base maps having said first predetermined scale, and assembling said color photographic base maps together to form said synthesis color photographic map.

The invention is likewise herein broadly claimed as s synthesis color photographic map, on a predetermined scale, covering a wide geographic area, said synthesis map comprising:

a number of color photographic base maps, each covering a selective portion of said wide geographic area on said predetermined scale;

means assembling said photographic base maps together to form said synthesis map, and wherein each of said photographic base maps is a photography of a forestry base map covering one of said selective portions on a scale larger than said predetermined scale, said forestry base map having been colored according to a given identification color code and then color photographed and scale reduced to said predetermined scale.

A description now follows of a preferred embodiment of the invention having reference to the appended drawing wherein:

FIG. 1 is a diagrammatic view of a series of forestry base maps;

FIG. 2 is a diagrammatic view of a series of color photographic base maps obtained from the forestry maps of FIG. 1, and FIG. 3 is a diagrammatic view of a synthesis color photographic map, made according to the invention and from the color photographic base maps of FIG. 1.

As mentioned above, the synthesis color photographic map proposes to reproduce a satellite-taken photography of a wide area of the earth surface, on the same scale as that of the satellite photography, which scale is hereinafter called the first predetermined scale.

This synthesis map 1 results from a number of geographic forestry maps 2, to be called the base maps for convenience, each covering a selective portion of the wide earth area above-mentioned but on a scale which is much larger than the first predetermined scale.

Each map 2, available from appropriate government agencies, is a hand drawn map plotted from approximately 75 conventional aerial photographies and may cover a territory of approximately 100 square miles. Each base map 2 is first colored according to a given identification color code. Thus, for instance, lakes, young resinous lumber areas, deciduous tree areas, mixed tree areas, marginal tree areas and the like are given different colors, according to the above-mentioned identification color code. The coloring is such that the nature of the tree growths or the presence of lakes or other earth features that are useful to recognize become readily and unmistakably identifiable.

Once each such base map 2 is appropriately colored, it is color photographed while its scale is reduced to the first predetermined scale. For convenience, two or more base maps 2 may be grouped and color photographed and scale reduced together.

As an example, such base maps 2 may be on a scale of 1:20,000 and color photographed on a reduced scale of 1:125,000 which would be that of the satellite photography which it is desired to reproduce, in colors. Other first predetermined scales may of course be selected to suit a particular satellite photography having a different scale.

There are thus obtained a group of photographic base maps 3 which are then assembled together to form the desired synthesis colored photographic map 1 (FIG. 3). The photographic base maps 3 may be held together by any known means such as strips of adhesive tape or they may simply be glued onto a carboard support.

It will also of course be appreciated that the synthesis color photographic map 1 which has the first predetermined scale may be color photographed again but on a different scale. In other words, the above-mentioned first predetermined scale may be selected when the color photographic base maps 3 are produced or after the synthesis color photographic map 1 is obtained.

I claim:

1. A method of making a synthesis color photographic map, on a first predetermined scale and covering a wide geographic area, from a number of forestry base maps, each forestry base map covering a selective portion of said wide geographic area on a second predetermined scale larger than said first predetermined scale, said method comprising the steps of:

coloring each of said forestry base maps according to a given identification color code:

color photographying said forestry base maps thus colored while reducing the scale thereof to said first predetermined scale to thereby obtain color photographic base maps having said first predetermined scale, and assembling said color photographic base maps together to form said synthesis color photographic map.

2. A method as claimed in claim 1, further comprising color photographying said synthesis map on a scale different from said first predetermined scale.

3. A synthesis color photographic map, on a predetermined scale and covering a wide geographic area, said synthesis map comprising:
a number of color photographic base maps, each covering a selective portion of said wide geographic area on said predetermined scale;
means assembling said photographic base maps together to form said synthesis map, and
wherein each of said photographic base maps is a photography of a forestry base map covering one of said selective portions on a scale larger than said predetermined scale, said forestry base map having been colored according to a given identification color code and then color photographed and scale reduced to said predetermined scale.

4. A synthesis color photographic map according to claim 3, wherein said assembling means are adhesive means.

5. A synthesis color photographic map according to claim 4, wherein said adhesive means comprise a cardboard support and a glue material binding said color photographic base maps to said support.

6. A synthesis color photographic map according to claim 4, wherein said adhesive means are strips of adhesive tape extending along adjoining edges of said forestry base maps.

* * * * *